United States Patent [19]
Shioiri et al.

[11] Patent Number: 4,749,473
[45] Date of Patent: Jun. 7, 1988

[54] PROCESS FOR REMOVING INK FROM WASTEPAPER

[75] Inventors: Akira Shioiri; Yoji Isobe; Hiroyasu Hayano, all of Kasugai, Japan

[73] Assignee: Oji Paper Co., Ltd., Tokyo, Japan

[21] Appl. No.: 68,716

[22] Filed: Jul. 1, 1987

Related U.S. Application Data

[63] Continuation of Ser. No. 776,269, Sep. 16, 1985, abandoned.

[30] Foreign Application Priority Data

Apr. 18, 1985 [JP] Japan ................................. 60-83425

[51] Int. Cl.$^4$ ........................ B03D 1/02; B03D 1/22
[52] U.S. Cl. .................................. 209/164; 209/170; 162/4; 261/87
[58] Field of Search ............... 209/164, 165, 167, 170; 210/703, 221.1, 221.2; 162/4; 261/87

[56] References Cited

U.S. PATENT DOCUMENTS

| | | | |
|---|---|---|---|
| 507,774 | 10/1893 | Ball | 209/170 |
| 1,608,896 | 11/1926 | MacIntosh | 209/170 |
| 4,288,319 | 9/1981 | Heijs et al. | 209/170 |
| 4,399,028 | 8/1983 | Kile et al. | 209/168 |

FOREIGN PATENT DOCUMENTS

| | | | |
|---|---|---|---|
| 742856 | 12/1943 | Fed. Rep. of Germany | 261/87 |
| 1027186 | 4/1958 | Fed. Rep. of Germany | 261/87 |
| 1517661 | 4/1969 | Fed. Rep. of Germany | 210/221.2 |
| 52-22953 | 6/1977 | Japan | 261/87 |
| 261395 | 7/1927 | United Kingdom . | |

OTHER PUBLICATIONS

Pfalzer, "The Injector Cell-a Low-energy Flotation Machine" *Tappi Journal*, Oct. 1982, pp. 73-76.

Flynn, "Precise Air Control Key to Efficient Flotation Cell Deinking Operation" *Pulp & Paper*, Jul. 1983, pp. 78-81.

*Primary Examiner*—S. Leon Bashore
*Assistant Examiner*—Andrew J. Anderson
*Attorney, Agent, or Firm*—Armstrong, Nikaido, Marmelstein & Kubovcik

[57] ABSTRACT

Wastepaper is treated by a ink-removing process in which an aqueous wastepaper pulp slurry is introduced into a treating vessel, air is blown into the wastepaper pulp slurry preferably through a number of air-blowing orifices formed on a peripheral surface of at least one horizontal cylinder located in the bottom portion of the vessel to absorb ink particles floating in the wastepaper pulp slurry by air bubbles ejected from the orifices and rising toward the wastepaper pulp slurry surface. The resultant ink-absorbed froth is then removed. In this process, air is blown in an amount satisfying the relationship (I)

$$G/L \geqq 5.0 \qquad (I)$$

wherein L is the volume (m$^3$) of the wastepaper pulp slurry in the treating vessel and G is the total volume (Nm$^3$) of the air bubbles blown into the vessel, to promote the contact of the air bubbles with the ink particles in the wastepaper pulp slurry.

4 Claims, 3 Drawing Sheets

PROCESS FOR REMOVING INK FROM WASTEPAPER

This application is a continuation of application Ser. No. 776,269 filed Sept. 16, 1985, now abandoned.

BACKGROUND OF THE INVENTION

(1) Field of the Invention

The present invention relates to a process and apparatus for removing ink from wastepaper. More particularly, the present invention relates to a process and apparatus for removing ink from wastepaper at a high ink-removing efficiency to obtain a high yield of paper pulp having an enhanced brightness.

(2) Description of the Related Art

It is well known to remove ink from wastepaper by preparing an aqueous slurry of wastepaper pulp treated with a chemical, for example, a carbon-removing agent or bleaching agent, in a treating vessel, by blowing air from the bottom portion of the vessel into the wastepaper pulp slurry in the treating vessel so as to cause the resultant air bubbles to absorb ink particles floating in the wastepaper pulp slurry while the bubbles rise to the surface of the wastepaper pulp slurry, and then by removing the resultant ink-absorbed froth from the wastepaper pulp slurry.

In the above-mentioned ink-removing process, to enhance the ink-removing efficiency, it is important to cause a uniform flow of a number of fine air bubbles into the wastepaper pulp slurry, to enhance the chances of contact of the ink particles with the fine air bubbles.

For this purpose, various approaches have been made. For example, U.S. Pat. Nos. 4,186,094 and 4,347,128 disclose one such approach in which an eddy stream of a wastepaper pulp slurry is formed in a treating vessel, an additional amount of the wastepaper pulp slurry is supplied into the vessel at angles tangential to the eddy stream so as to flow the wastepaper pulp slurry in the eddy stream, and air bubbles are blown into the eddy stream of the wastepaper pulp slurry. However, the ink-removing effect of the above-mentioned method is unsatisfactory.

Japanese Unexamined Pat. Publication No. 50-25804 published on March 18, 1975 for Escher Wyss GbmH discloses another approach in which air is blown through a number of holes perforated on a plate fixed in the bottom portion of a treating vessel.

DE-OS No. 2,409,235 published on Oct. 23, 1975, for Escher Wyss GmbH, discloses still another approach in which air was blown through a number of holes formed on a periphery of an air-blowing pipe fixed in the bottom portion of a treating vessel.

However, the holes on the plate are sometimes blocked by dusts in the wastepaper pulp slurry and the resultant ink-removing effect is unsatisfactory.

It is generally believed that the brightness of the ink-removed wastepaper pulp is increased with an increase in the ratio (G/L) of the entire volume (G) of the air bubbles in the treating vessel to the volume (L) of the wastepaper pulp slurry in the treating vessel. However, it is also believed that the increase in the brightness of the ink-removed wastepaper pulp reaches saturation, at a certain point, even if the ratio (G/L) is further increased. That is, an excessive increase of the entire volume (G) of the air bubbles is not effective for enhancing the brightness of the resultant pulp and is not economical. Therefore, in the conventional ink-removing process, the ratio (G/L) is limited to a relatively small value, that is, 1.5 or more but less than 5.0.

Furthermore, in the conventional ink-removing processes and apparatuses, it is taught that it is very difficult and uneconomical to increase the ratio G/L to 5.0 or more.

In the other approach, the wastepaper pulp slurry which has been treated with the air bubbles is further washed one or more times with fresh water. This washing procedure results in a decrease in the yield of the resultant ink-removed pulp and also in the contamination of environmental water by the waste water discharged from the washing procedure.

Under the above-mentioned circumstances, it is desired by the industry that a new process and apparatus be provided that will effectively remove ink at a high efficiency and with a high yield of ink-removed pulp having an enhanced brightness.

SUMMARY OF THE INVENTION

An object of the present invention is to provide a process and apparatus for removing ink from wastepaper at a high ink-removing efficiency.

Another object of the present invention is to provide a process and apparatus for removing ink from wastepaper, which is effective for recovering wastepaper pulp having an enhanced brightness.

The above-mentioned objects can be attained by the process and apparatus of the present invention.

The process of the present invention for removing ink from wastepaper comprises the steps of, introducing an aqueous slurry of wastepaper pulp into a treating vessel; blowing a number of air bubbles into the waste-paper pulp slurry in the treating vessel to cause the air bubbles to absorb ink particles from the wastepaper pulp slurry while rising to the surface of the wastepaper pulp slurry; and removing the resultant ink-absorbed froth from the wastepaper pulp slurry, which process is characterized in that, in the air-blowing step, air is blown in an amount satisfying the relationship:

$$G/L \geq 5.0$$

wherein L represents the volume in $m^3$ of the wastepaper pulp slurry in the treating vessel and G represents the total volume in $Nm^3$ of the air bubbles blown into the wastepaper pulp slurry.

In the process of the present invention, it is preferable that the air bubbles are blown into the wastepaper pulp slurry through a number of orifices formed on a peripheral surface of at least one horizontal cylinder located in the bottom portion of the treating vessel. Also, it is preferable that the horizontal cylinder is rotated around a horizontal axis thereof.

The apparatus of the present invention for removing ink from wastepaper comprises, a treating vessel for containing an aqueous slurry of wastepaper pulp, having an entrance and an exit for the wastepaper pulp slurry; at least one air-blowing horizontal cylinder located in the bottom portion of the vessel, having a number of air-blowing orifices formed on the peripheral surface of the cylinder and connected to an air-supply source, the horizontal cylinder being rotatable around the horizontal axis of the cylinder; and means, for removing resultant froth from the wastepaper pulp slurry, located above the surface of the wastepaper pulp slurry in the vessel.

DESCRIPTION OF THE PREFERRED EMBODIMENTS

In the process of the present invention, wastepaper is converted into an aqueous wastepaper pulp slurry by usual procedures and then introduced into a treating vessel, preferably in the form of a vertical drum. Air is then blown into the wastepaper pulp slurry in the vessel. It is preferable that air is blown through a number of air-blowing orifices formed on a peripheral surface of at least one horizontal air blowing cylinder located in the bottom portion of the treating vessel, preferably while the horizontal cylinder is rotated around the horizontal axis of the cylinder. The blown air is converted to a number of fine air bubbles, to absorb ink particles floating in the wastepaper pulp slurry while rising from the orifices to the surface of the wastepaper pulp slurry in the treating vessel. The ink-absorbed bubbles form a froth on the surface of the wastepaper pulp slurry, and this froth is then removed from that surface.

Figure 1:
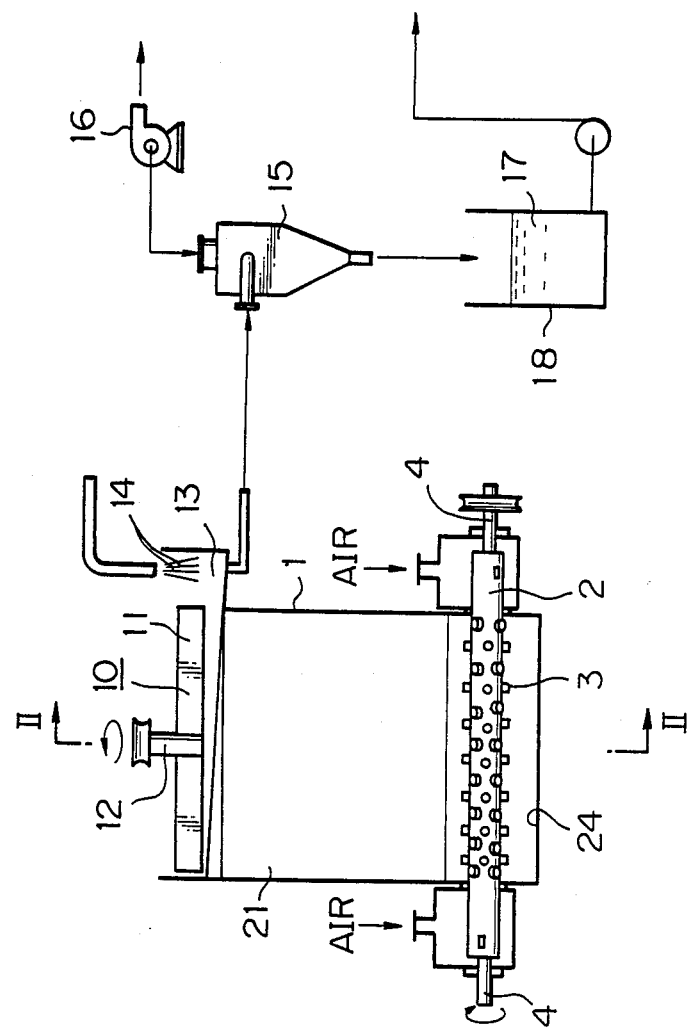
FIG. 1 is a vertical cross-sectional explanatory profile of an embodiment of the apparatus of the present invention.
Figure 2:
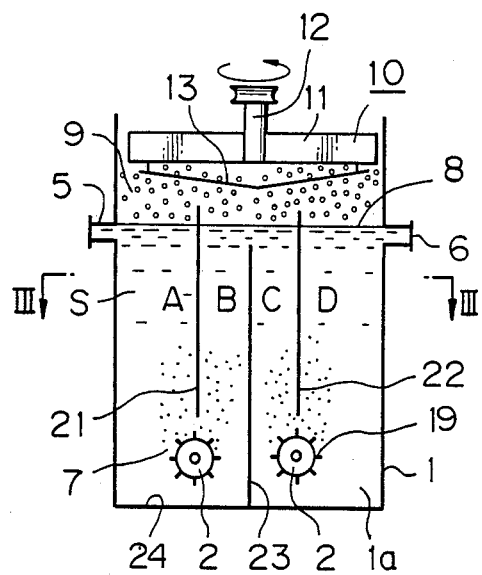
FIG. 2 is a vertical cross-sectional explanatory profile of the apparatus as shown in FIG. 1, taken along the line II—II in FIG. 1.
Figure 3:
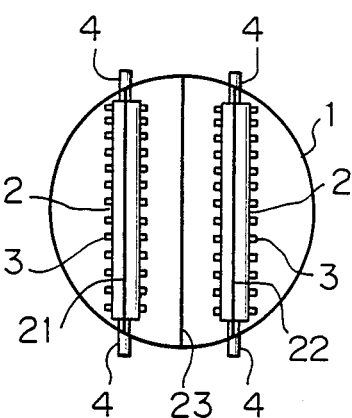
FIG. 3 is a horizontal cross-sectional explanatory profile of the apparatus shown in FIGS. 1 and 2, taken along the line III—III in FIG. 2.

Referring to FIGS. 1, 2, and 3, a treating vessel (floatater) 1 is provided with at least one air-blowing horizontal cylinder 2 located in the bottom portion 1a of the vessel 1. The cylinder 2 has a number of air-blowing orifices 3 and is connected to a supply source of air (not shown in the drawings). The cylinder 2 is rotatable around a horizontal shaft 4 extending along the horizontal axis of the cylinder 2.

A wastepaper pulp slurry 5 containing ink particles is introduced from a supply source (not shown) into the vessel 1 through an entrance trough 5, flows through the vessel 1, and is then discharged therefrom through an exit trough 6 to the outside of the vessel 1. When the vessel 1 is filled with the wastepaper pulp slurry S, air is blown from a supply source (not shown) into the wastepaper pulp slurry S through the horizontal air-blowing cylinder 2 and the air-blowing orifices 3, while the horizontal cylinder 2 is rotated. This procedure causes the creation of a number of air bubbles 7 distributed throughout the wastepaper pulp slurry S in the vessel 1. The air bubbles 7 float to the surface 8 of the wastepaper pulp slurry S and the ink particles floating in the wastepaper pulp slurry S are absorbed on the interfaces between the air bubbles 7 and the medium liquid of the water paper pulp slurry S. The ink-absorbed air bubbles 7 reach the surface 8 of the wastepaper pulp slurry and form a froth 9 on the surface of the wastepaper pulp slurry S. The ink-absorbed froth 9 is removed from the wastepaper pulp slurry S in the vessel 1 by means of a froth-removing device 10. The froth-removing device 10 is provided with a plurality of blades 11 rotating around a shaft 12. When the blades 11 are rotated, the froth 9 on the wastepaper pulp slurry surface 8 is collected and discharged into a froth-discharging trough 13. The collected froth 9 is treated with a water shower 14 and is allowed to flow into an air-liquid separator 15 to separate the removed ink-containing liquid from the air. The separated air is discharged into the outside atmosphere through a pump 16. The separated ink-containing liquid 17 is collected in a vessel 18 and is then discharged to the outside of the apparatus or, if necessary, is supplied into a secondary ink-removing apparatus (secondary floatater) (not shown).

It is important that, in the process and apparatus of the present invention, air is introduced into the wastepaper pulp slurry S in an amount satisfying the relationship (I).

$$G/L \geq 5.0 \tag{I}$$

wherein L represents the volume in m³ of the wastepaper pulp slurry S in the treating vessel 1 and G represents the total volume in Nm³ of the air bubbles 7 blown into the wastepaper pulp slurry S in the treating vessel 1. The ratio G/L is preferably 10 or more. It was found that the increase of the ratio G/L to 5.0 or more is very effective for enhancing the brightness of the resultant pulp, and when the ratio G/L is less than 5.0, the brightness of the resultant pulp and the ink-removing efficiency are unsatisfactory.

In order to introduce air in the above-mentioned large ratio (G/L) into the wastepaper pulp slurry, it is preferable to rotate the air-blowing horizontal cylinder 2 having a number of air-blowing orifices 3 to agitate the wastepaper pulp slurry 5 and to convert the blown air into small bubbles 7.

Figure 4:
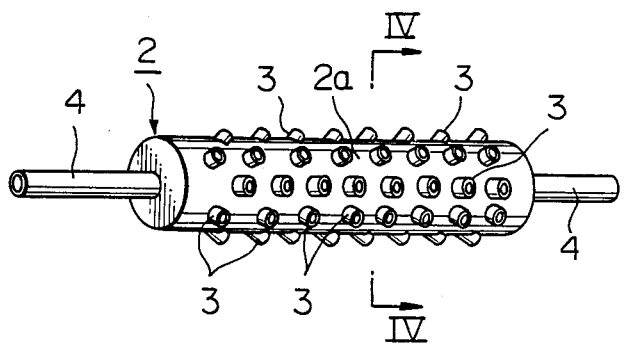
FIG. 4 is a perspective view of an air-blowing horizontal cylinder usable for the apparatus of the present invention.
Figure 5:
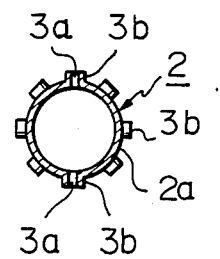
FIG. 5 is a vertical cross-sectional profile of the cylinder shown in FIG. 4, taken along line IV—IV in FIG. 4; and, FIG. 6 is a graph showing the relationship between the ratio G/L and the increase in brightness of the ink-removed wastepaper pulp.

In the process of the present invention, it is preferable that the wastepaper pulp slurry S in the treating vessel 1 be agitated. For this purpose, the orifices 3 project from the peripheral surface 2a of the horizontal cylinder 2 as shown in FIGS. 4 and 5. Each orifice 3 is in the form of a short pipe 3b having a hollow 3a through which air is ejected.

The horizontal cylinder 2 may have a number of agitating paddles 19, as shown in FIG. 2, extending outward from the peripheral surface 2a of the cylinder 2.

When the horizontal cylinder 2 is rotated at a predetermined rotating peripheral speed, preferably from 6 to 11 m/sec, the projected orifices 3 or paddles 19 agitate the wastepaper pulp slurry S so as to accelerate the contact of the air bubbles 7 with the ink particles and to promote the rising speed of the air bubbles 7 through the wastepaper pulp slurry S.

Another way of promoting the contact of the air bubbles 7 with the ink particles is to make the size of the air bubbles 7 as small as possible, i.e., to a point at which the rising speed of the air-bubbles 7 becomes excessively slow.

The size of the air bubbles 7 can be controlled to a desired value by adjusting, respectively, the inside diameter 3a of the air-bubbling orifices 3, the length of the projected air-bubbling orifices 3b, the ratio of the total cross-sectional area of the air-bubbling orifice 3 to the entire peripheral surface area 2a of the horizontal cylinder 2, the rotating peripheral speed of the horizontal cylinder 2, and the blow rate and blowing pressure of air per unit area of the cross-section of each orifice 3, to appropriate values.

For example, it is preferable that, in the air-blowing step, the air-blowing rate satisfy the relationship (II):

$$0.5 \leq g/A \leq 2.0$$

wherein g represents an air-blowing rate in $Nm^3/min$ through all the air-bubbling orifices 3 and A represents the area in $m^2$ of the horizontal cross-section of the treating vessel 1.

A more preferable relationship is $$1.0 \leq g/A \leq 2.0$$

If the ratio g/A is less than 0.5, it can become difficult to bring the ratio to G/L 5 or more. Also, a ratio g/A of more than 2.0 sometimes causes the size of the resultant air bubbles 7 to become excessively large, resulting in an undesirable bumping phenomenon occurring in the wastepaper pulp slurry S.

When the ratio g/A is kept within the range of from 0.5 to 2.0, it is possible to keep the ratio G/L at the level of 5.0 or more, without causing bumping in the wastepaper pulp slurry S.

It is preferable that the inside diameter of the air-bubbling orifices 3 be in the range of from 5 to 40 mm, more preferably from 15 to 35 mm. The inside diameter 3a of the orifices 3 should be determined by taking into consideration the rotation speed of the horizontal cylinder 2, the level of the wastepaper pulp slurry S in the vessel 1, the concentration of waste-paper pulp in the slurry S, and the other operational conditions. The length 3b of the orifices 3 extending from the peripheral surface 2a of the horizontal cylinder 2 is perferably in the range of from 2.5 to 20 mm, more preferably from 3 to 10 mm. These projected orifices 3 are highly effective for promoting contact between the ink particles and the air bubbles 7 in the wastepaper pulp slurry S.

In the process of the present invention, it is preferable that the wastepaper pulp slurry S in the treating vessel 1 flow downward in countercurrent to the rising flow of the air bubbles 7 blown from each horizontal cylinder 2 and the flow upward concurrently with the rising flow of the air bubbles 7 blown from the horizontal cylinder 2. When air is blown from two or more horizontal cylinders 2, the combination of the above-mentioned downward and upward flows of the wastepaper pulp slurry S may be carried out twice or more. For the downward and upward flows, in the apparatus of the present invention, the treating vessel 1 is preferably divided into at least two compartments connected to each other by at least one vertical partition.

Referring to FIGS. 1, 2 and 3, vertical partitions 21 and 22 are inserted into the treating vessel 1. Each of the vertical partitions 21 and 22 is located above each of the horizontal cylinders 2 and extended vertically from above the surface 8 of the wastepaper pulp slurry S in the vessel 1 to a point near to the corresponding horizontal cylinder 2, through the waste paper pulp slurry surface 8.

Another vertical partition 23 is located between two adjacent horizontal cylinder 2 and extended vertically from the bottom 24 of the treating vessel 1 to a point near to the surface 8 of the wastepaper pulp slurry S in the vessel 1.

Referring to FIG. 2, the space inside the treating vessel 1 is divided into four compartments A, B, C and D by the vertical partitions 21 and 22 and the other partition 23.

The compartments A and B, and C and D are respectively connected to each other at the bottom portion of the vessel 1 below the lower ends of the partitions 21 and 22 and around the horizontal cylinder 2. Also, the compartments B and C are connected to each other at the upper portion of the vessel 1 above the upper end of the other partition 23.

The wastepaper pulp slurry S introduced into the treating vessel 1 through the entrance trough 5 flows downward through the compartment A in countercurrent to the rising flow of the air bubbles 7, then upward through the compartment B concurrently with the rising flow of the air bubbles 7. The wastepaper pulp slurry S flows downward through the compartment C and then upward through the compartment D in the same manner as mentioned where, and finally flows out through the exit trough 6 to the outside of the vessel 1. While the wastepaper pulp slurry S travels through the compartments A to D, the ink particles in the slurry S are absorbed by the air bubbles 7. The resultant ink-absorbed froth 9 is accumulated on the surface 8 of the wastepaper pulp slurry S and is discharged by the froth-removing device 10 in the afore-mentioned manner. The abovementioned downward and upward flow of the wastepaper pulp slurry S is highly effective for promoting the contact of the ink particles with the air bubbles 7 and for enhancing the ink-removing efficiency.

The embodiment of the apparatus indicated in FIGS. 1, 2, and 3, is provided with two horizontal cylinders 2, and the treating vessel 1 is divided into four compartments. However, the apparatus of the present invention may contain only one horizontal cylinder 2 and two compartments, or three or more horizontal cylinders 2 and six or more compartments.

The rising speed of the ink-absorbed air bubbles 7 is variable depending upon the concentration and temperature of the wastepaper pulp slurry S. The lower the concentration and the higher the temperature of the wastepaper pulp slurry S, the higher the ink-removing efficiency. The wastepaper pulp slurry S has a preferable concentration of from 0.5 to 1.5% and a temperature of from 10° C. to 50° C.

In the process of the present invention, the effect of the severe agitation of the wastepaper pulp slurry by rotating the horizontal cylinder 2 having air-blowing orifices 3 is synergetic with the effect of the air-blowing in the large ratio G/L of 5.0 or more, to promote the contact of the air bubbles 7 with the ink particles in the wastepaper pulp slurry S and to enhance the ink-removing efficiency and the brightness of the resultant pulp.

SPECIFIC EXAMPLE

The present invention will be further illustrated by the following example which is representative and does not restrict the scope of the present invention in any way.

EXAMPLE

Wastepaper was defiberized to provide an aqueous pulp slurry and treated with an ink-removing agent and bleaching agent. The resultant aqueous wastepaper pulp slurry had a dry concentration of pulp of 1.1%.

The bleached wastepaper pulp slurry was introduced at a supply rate (l) of 26 l/min, 40 l/min, 80 l/min, or 160 l/min into a treating vessel as shown in FIGS. 1, 2, and 3 having a cross-sectional area A of 0.4 m² and a capacity of 800l. The treating vessel contained therein two air-blowing cylinders having a length of 1 m and an inside diameter of 78 mm and provided with 200 air-blowing orifices having a length of 5 mm and an inside diameter of 11.4 mm. The distance between the surface of the wastepaper pulp slurry in the vessel and the horizontal axis of the horizontal cylinders was 1.5 m.

Air was blown at a supply rate of 0.15 to 1.21 Nm³/min into the wastepaper pulp slurry at a temperature of 30° C.

When the operation was carried out at a ratio G/L of 5.0 and at a ratio g/A of 0.38, an increase in the brightness of the resultant pulp over that of the bleached wastepaper pulp was 9.0%. When the operation was effected at a ratio G/L of 5.0 at a ratio g/A of 1.16, the increase in brightness of the resultant pulp was 7.3%.

At a ratio G/L of 10 and at a ratio of g/A of 0.38, the increase in brightness of the resultant pulp was 12.2%. At a ratio G/L of 10 and at a ratio of g/A of 1.16, the increase in brightness of the resultant pulp was 9.8%.

Figure 6:
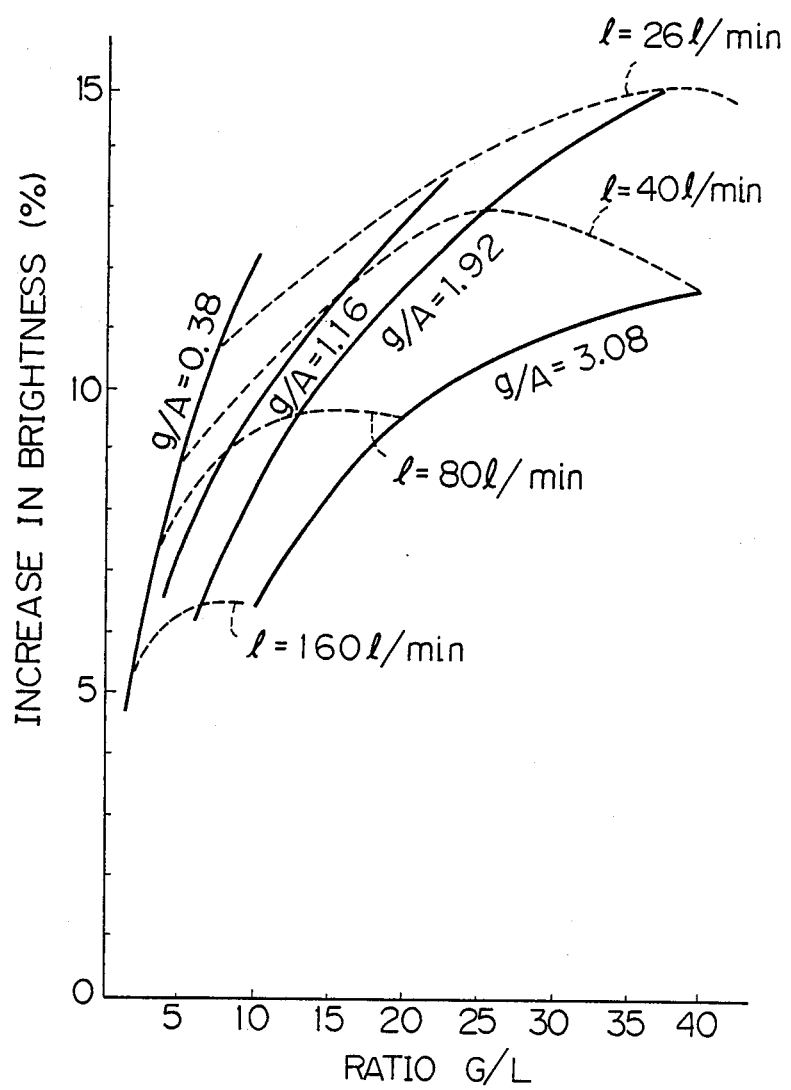

Referring to FIG. 6, the increase (%) in brightness of the resultant pulp is satisfactory at the ratio G/L of 5.0 or more.

FIG. 6 also indicates that an excessively large ratio g/A of 3.08 is not preferable for enhancing the brightness of the resultant pulp even at the ratio G/L of 5.0 or more.

We claim:

1. A process for removing ink from wastepaper, comprising;

introducing an aqueous slurry of wastepaper into a treating vessel;

blowing a number of air bubbles into the wastepaper pulp slurry in the treating vessel to cause the air bubbles to absorb ink particles from the wastepaper pulp slurry while rising to the surface of the wastepaper pulp slurry; and removing the resultant ink-absorbed froth from the wastepaper pulp slurry, which process is characterized in that, in said air-blowing step, air is blown into the wastepaper pulp slurry through a number of orifices formed on and projecting in the form of short pipes or tubes from a peripheral surface of at least one horizontal cylinder located in a bottom portion of the treating vessel, while the horizontal cylinder is rotated around the horizontal axis thereof to agitate the wastepaper pulp slurry, and the amount of the blown air is controlled to a level satisfying the relationships (I) and (II):

$$G/L \geqq 5.0 \qquad (I)$$

and $$0.5 \leqq g/A \leqq 2.0 \qquad (III)$$

wherein L represents the volume in m³ of the wastepaper pulp slurry in the treating vessel and G represents the total volume in Nm³ of the air bubbles blown into the wastepaper pulp slurry, g represents a blowing rate of air in Nm³/min and A represents a horizontal cross-sectional area of the treating vessel in m².

2. The process as claimed in claim 1, wherein the ratio G/L is 10 or more.

3. The process as claimed in claim 1, wherein in the air-blowing step, the wastepaper pulp slurry in the treating vessel flows downward in countercurrent to the rising flow of the air bubbles blown from each horizontal cylinder, and then upward concurrently to the rising flow of the air bubbles blown from the horizontal cylinder.

4. The process as claimed in claim 3, wherein air is blown from two or more horizontal cylinders and the downward and upward flowing of the wastepaper pulp slurry is repeated twice or more.

* * * * *